May 10, 1966 T. T. TRUE 3,250,948

PROJECTION TELEVISION SYSTEM

Filed Nov. 7, 1963 2 Sheets-Sheet 1

INVENTOR:
THOMAS T. TRUE,
BY Julius J. Zaskalicky
HIS ATTORNEY.

PROJECTION TELEVISION SYSTEM

Filed Nov. 7, 1963

2 Sheets-Sheet 2

INVENTOR:
THOMAS T. TRUE,
BY Julius J. Zaskalicky
HIS ATTORNEY.

3,250,948
PROJECTION TELEVISION SYSTEM
Thomas T. True, Camillus, N.Y., assignor to General Electric Company, a corporation of New York
Filed Nov. 7, 1963, Ser. No. 322,154
3 Claims. (Cl. 315—22)

The present invention relates in general to projection television systems, and in particular to improvements in electrical means for conditioning the light modulating medium used in such a system.

One form of apparatus utilized in such a system comprises a pair of light masks having similar arrays of transparent and opaque portions thereon, a light modulating medium located between the light masks and adapted to be deformed into light diffraction gratings by electron charges deposited thereon in response to electrical signals in correspondence to an image to be projected, and a source of light. When the surface of the modulating medium is deformed by the deposition of a pattern of electron charges thereon in response to electrical signals corresponding to the image to be projected, light incident on the medium is diffracted and passes through the transparent portions in the output mask onto a screen to form an image corresponding to the electrical signals. One such system is described in U.S. Patent Re. 25,169, W. E. Glenn, entitled Colored Light System and assigned to the assignee of the present invention.

The light modulating medium in such a system is usually in the form of a viscous fluid and must be continually replaced to prevent decomposition of the molecules thereof resulting from bombardment by the electron beam if proper operation of the system is to be assured. In accordance with this requirement new liquid is continuously applied to the active area of the light modulating medium. In providing a continual flow of fluid, one of the problems encountered is a churning, randomly undulating motion of the fluid surface when such a surface is bombarded by the electron beam. Light is deviated by such a fluid in a manner other than desired producing what is commonly referred to as noise in the background of images much like the noise in the standard television system, thereby spoiling the dark field of the television picture and lowering the contrast obtainable in such a system. The noise of any particular fluid results from many influences including the current and velocity of the electron beam, the viscosity and other properties and characteristics of the light modulating medium.

The present invention particularly relates to means for smoothing the viscous light modulating medium utilized in such a system prior to the deposition of electron charges thereon corresponding to the image to be projected and is an improvement in the invention described and claimed in copending patent application Serial No. 94,860, now Patent 315,871, William E. Good and Thomas T. True, filed March 10, 1961 and assigned to the assignee of the present application. In that application there is provided in a projection system means associated with the electron beam which scans the active area of the light modulating medium for increasing the charge density deposited on the light modulating medium at the initiation of each line of horizontal scan for conditioning the light modulating medium. One way of accomplishing such result, described in the aforementioned application, utilizes the horizontal fly-back or blanking pulses from the horizontal deflection circuits for generating by differentiation another pulse in time correspondence with the lagging edges thereof and occurring at the initiation of the horizontal pulse, i.e., during the time between back trace and forward trace, and applying such pulse to the controlling electrodes of the electron beam device to correspondingly increase the current density of the electron beam during such interval when the electron beam is stationary or moving slowly. Even with such an arrangement it has been found that control of the charge deposited for optimum conditioning is difficult to obtain and that the deposition extends appreciably out into the trace interval. The present invention is directed to providing further control on the current density of the electron beam during such time in the horizontal scan thereof so as to deposit a precise amount of charge over a precise time interval, thereby to optimize the smoothing and leveling effect such charge has on the fluid modulating medium without compromising uniformity of beam current during the trace interval.

Accordingly, it is an object of this invention to provide improvements in the electrical means for conditioning the light modulating medium in a projection television system.

A further object of this invention is to provide an improved light valve projector with a simple, economical and reliable means for precise control of the charge deposition means to produce optimum dark field and contrast in the images produced.

In carrying out the present invention there is provided a projection system circuit means associated with the electron beam device utilized in such systems for precise control to optimum values of the increase in the charge density and of carefully controlled time extent on the light modulating medium at the initiation of each horizontal scan or trace thereof.

The novel features believed characteristic of the invention are set forth in the appended claims. The invention itself, together with further objects and advantages thereof, may best be understood by reference to the following description taken in connection with the accompanying drawings in which:

Figure 1:
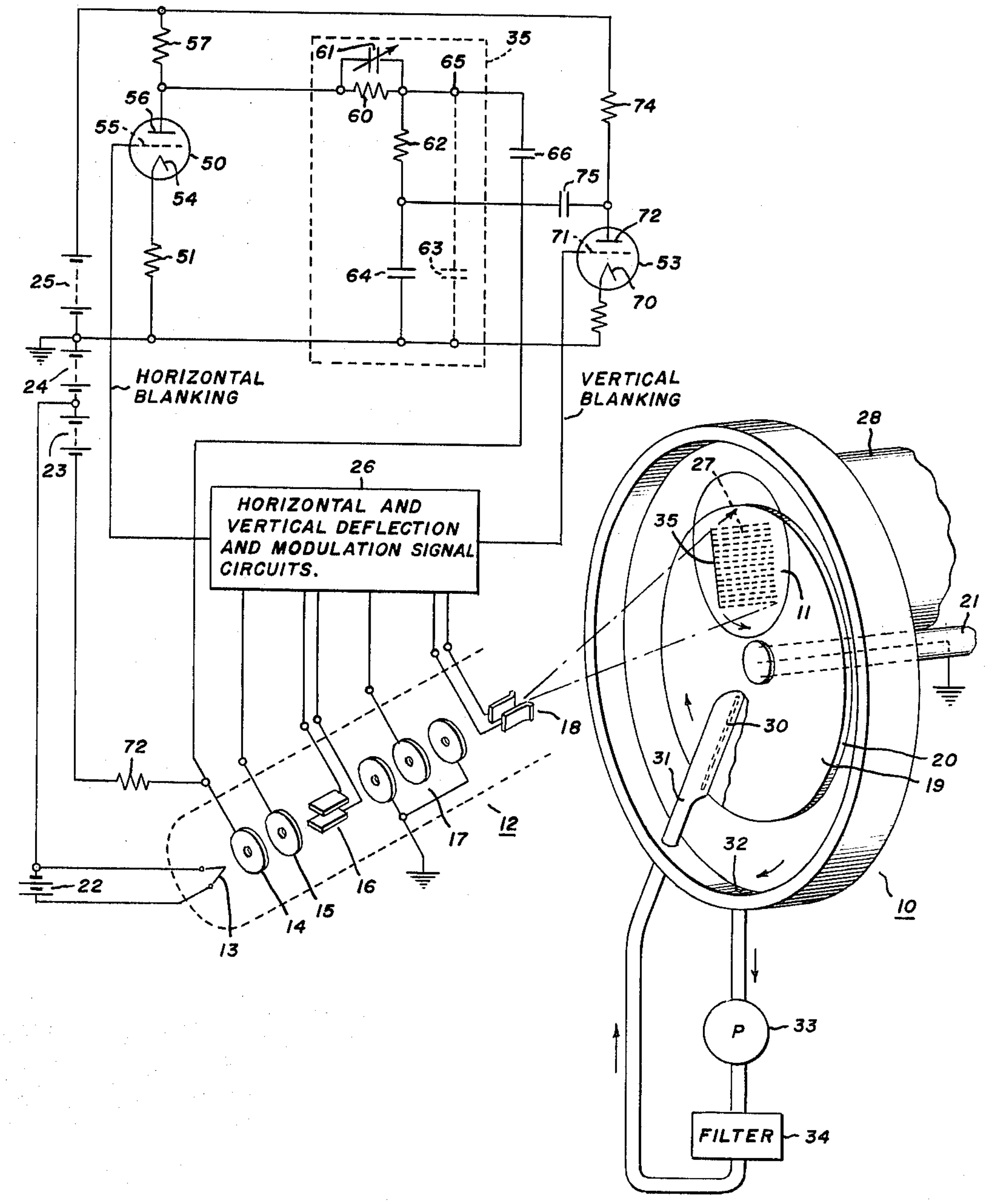
FIGURE 1 is a schematic diagram of a portion of the television projection system embodying the present invention.

Referring now to FIGURE 1 there is shown a portion 10 of an enclosure in which is provided a light modulating medium 11 and an electron beam device 12. The light modulating medium 11 is a suitable transparent fluid of appropriate viscosity and conductivity deformable into phase diffraction gratings by electron charges deposited thereon by an electron beam device 12. The electron beam device 12 comprises a cathode 13, a control electrode 14, an anode 15, a pair of vertical deflection plates 16, focusing electrode system 17, a pair of horizontal deflection plates 18, and the target electrode 19 consisting of a conductive coating on the transparent modulating medium circulating disk 20 which rotates about shaft 21.

An optical channel is provided, of which only that portion which is in the immediate vicinity of the light output side of the light modulating medium is shown. The input portion of the optical channel directs light through a portion of the medium 11 on which light diffraction gratings are formed.

A continuously circulating system for the fluid is provided by means of a slot 30 along the length of the tube 31 inside the enclosure which directs the oil onto a rotatable disk 20. Excess fluid flows through an outlet 32 to a tube which supplies fluid to a pump 33. The fluid is then put through a filter 34 and returned to the outlet by way of the tube 31 thereby to provide a continuous flow of fluid on the disk or plate 20. The side of the plate facing the electron beam and on which the fluid is contained is coated with a transparent conducting layer 19, such as indium oxide, which is connected in circuit with the other elements of the electron beam device and maintained at a large positive potential with respect to cathode 13. Electron charges deposited on the surface of the fluid exert forces thereon to deform it into light diffraction gratings.

The various enumerated electrodes of the electron beam device 12 are connected to appropriate voltage sources including unidirectional sources 22, 23, 24 and 25 and alternating sources of block 26 for producing a beam thereon which is then caused to scan the target area thereof on the light modulating medium in horizontal lines 27 spaced at successive vertical intervals in accordance with television practice.

In the case of the system described above a much higher frequency carrier wave is applied to the horizontal deflection plates 18 to modulate the velocity in the horizontal direction of scan of the electron beam to produce a plurality of bunches of charge in each line of scan. Corresponding bunches of charge in each line are aligned to form a diffraction grating with vertically oriented lines. In a color television system a plurality of gratings are laid down by carrier waves of different frequencies.

As was pointed out above, a turbulence or disturbance occurs in the deformable light modulation medium due to the motion of the disk and the charge deposition on the raster area resulting in noise in the projected image. In order to eliminate such noise the fluid must have a smooth surface on which the charge patterns are to be deposited. In the aforementioned patent application an electron beam current is used which is not uniform over the raster. The beam current is pulsed to a high value at the leading edge 35 of the raster where fresh fluid is brought in on the surface of the disk. The forces on the fluid resulting from such deposited charge causes the major portion of the fluid to flow above and below the raster, and allows only a very thin layer to continue over the raster. Such a thin layer of fluid has been found to be very quiet over a wide range of beam currents. Accordingly, the raster current in the region where diffraction gratings are to be formed can be optimized for best grating writing without compromising smoothness of the fluid surface.

In the circuit of FIGURE 1 the horizontal flyback pulses from the horizontal sweep circuit are processed by a particular network 35 and applied to particular beam current control electrodes of the electron beam device to control the beam current density at the time the electron beam is initiating its horizontal trace across the active area of the light modulating medium, i.e., reversing its direction of scan from retrace to trace.

Figure 2A:
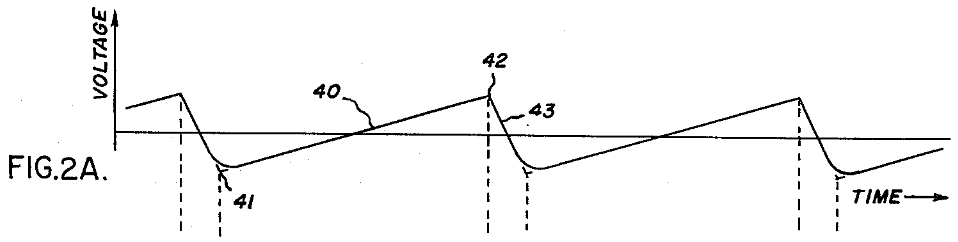
FIGURES 2A, 2B, 2C and 2D show a series of voltage versus time graphs useful in explaining the operation of the present invention.

FIGURE 2A shows a waveform of voltage versus time representing horizontal deflection voltage applied to the horizontal deflection plates. This waveform has a gradually rising portion 40 points on which correspond to position of the electron beam between the left and right edges of the active area. The point 41 corresponds to the left hand edge and point 42 corresponds to the right hand edge. The waveform also includes a sharply falling portion 43 representing the return of the electron beam to the left hand edge from the right hand edge prior to initiation of the next horizontal deflection across the active area. The transition from the sharply falling portion 43 to the gradually rising portion 40 is not abrupt in an actual circuit but rounded about the point 41, as shown. During the period of time in the vicinity of the point 41 the beam is practically stationary and represents the optimum condition for deposition of charge for the purpose indicated.

Figure 2B:
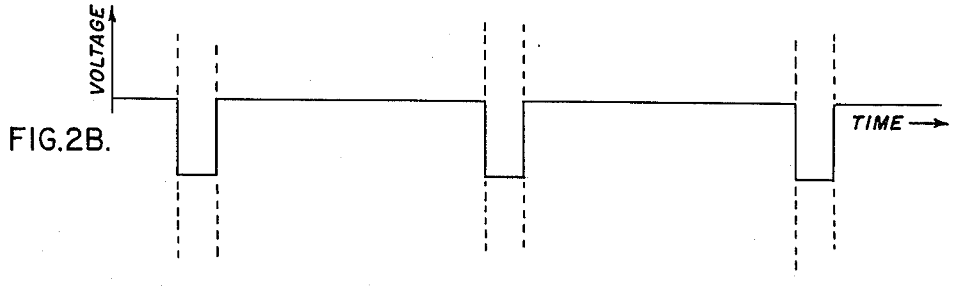

The waveform of FIGURE 2B represents the horizontal fly-back pulses which are coincident with the sharply falling portion 43 of the horizontal sawtooth deflection wave. This waveform also represents the fly back voltage at the output of network 35 under conditions of compensation in which neither differentiation or integration predominates.

Figure 2C:
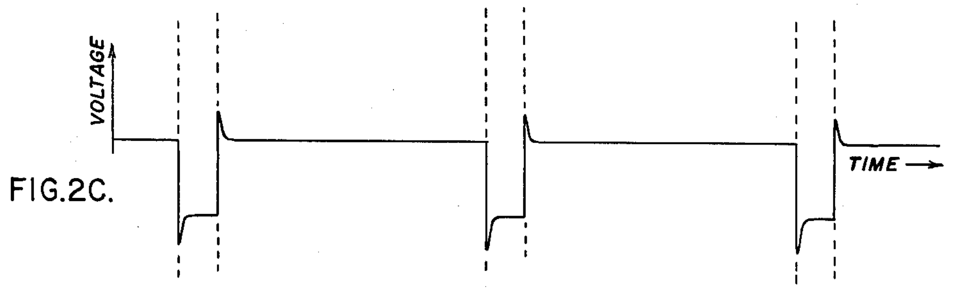

FIGURE 2C shows a waveform of fly back voltage after it has been modified by an appropriate proportioned circuit of resistance and capacitance divider network 35, representing a compensation of the waveform in which differentiation predominates.

Figure 2D:
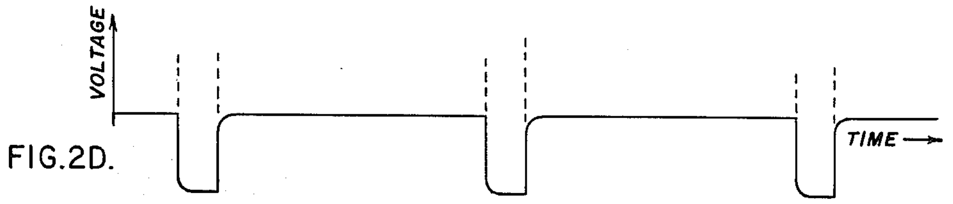

FIGURE 2D shows the horizontal blanking wave of voltage which has been modified in accordance with network 35 of the present invention in which integration effects predominate.

In FIGURE 1 the circuits associated with the electron discharge device 50 function to amplify the horizontal fly back or blanking pulse to wave forming network 35, the output of which is then applied to the grid-cathode circuit of the electron beam device 12. Circuits associated with electron discharge device 53 function to couple the vertical blanking pulses to the grid-cathode circuit of the electron beam device 12 to blank the electron beam during vertical retrace thereof.

Referring now more particularly to the circuits of FIGURE 1 the electron discharge device 50 comprises a cathode 54, a control grid 55, and an anode 56. The cathode 54 is coupled through a cathode resistance 51 to ground. The control grid 55 is connected to the horizontal deflection circuit of the receiver 26 for deriving horizontal fly back pulses therefrom. The anode 56 is connected through resistance 57 to the positive terminal of a source 25 of anode voltage, the negative terminal of which is connected to ground. The anode 56 is also connected to the input of wave shaping network 35. The wave shaping network 35 for shaping the horizontal blanking pulses comprises a pair of parallel circuits, one of which includes a resistor 60 and a variable capacitor 61 connected in parallel, and the other of which includes a resistor 62 and a capacitor 63, shown dotted, as it represents stray capacitance but may as well be a discrete component. The resistance 62 is connected in parallel with the capacitance 63 through another capacitance 64 much larger in magnitude than the capacitor 63. The capacitor 64 functions as a horizontal by-pass capacitor. The parallel circuits are connected in series between the anode 56 and ground. The common point 65 of the aforementioned circuits is connected through a coupling capacitor 66 to the grid 14 of the electron beam device. The control electrode 14 is also connected through a series limiting resistor 72 to the negative terminal of the source of control bias voltage 23, the positive terminal of which is connected to the cathode 13. The cathode 13 in turn is negatively biased with respect to ground by source 24.

When the impedances of the wave shaping network 35 are adjusted to particular values, the shape of the fly back or blanking pulse appearing between the point 65 and ground has the waveform shown in FIGURE 2B. When the capacitance 61 is adjusted to have its largest value, the reactance of capacitor 61 for the frequencies represented by the blanking pulse is small in relation to the impedance of the other resistors and capacitors in the network, and the shape of the modified blanking pulse is of the form shown in FIGURE 2C. When the capacitor 61 is adjusted to have its smallest value, its reactance is quite large, and accordingly the shape of each of the blanking pulses appearing between point 65 and ground is of the form shown in FIGURE 2D. Ideally, for good modulation of a light modulating medium of high viscosity during the trace interval, the blanking pulse applied to the electron beam device should have the form indicated in FIGURE 2B. Expressed in other words modification of thickness of the light modulating medium by the electron beam by the deposition of charge thereon during the blanking interval should not extend out into the trace interval, at least not appreciably so. Prior art arrangements utilize a simple differentiating circuit consisting of a capacitance and resistance operating on the lagging edge of the fly back or blanking pulse to produce a pulse which is applied at the initiation of each horizontal trace to produce the desired concentration of charge. Such arrangements had the effect of extending charge deposition out into the trace interval thereby affecting the performance of the light modulating medium during this period. In accordance with the present invention such effects are largely avoided, and greatly improved performance results. When the wave shaping network is adjusted so that the output appearing between terminals 65 and ground is of the form shown in FIGURE 2C, the trace interval is virtually unaffected while at the same time a pulse of adjustable magnitude, depending upon the value of the capacitance, is applied to the current controlling electrodes of the electron beam device to deposit at the initiation of each beginning trace, i.e., during the turn around interval, the proper amount of charge and for the proper amount of time. The network has the effect of enabling the pulse of voltage to decay to its idealized value for the trace interval thereby having minimal effect on the charge deposition on the light modulating medium during the trace interval. For some light modulating mediums of low viscosity it may be desirable to adjust the capacitance of the network to provide a waveform at the output of the form shown in FIGURE 2D. Here again the change in charge deposition, in this case a reduction, is precisely controllable and for a precise period of time without appreciably affecting charge deposition during the trace interval.

Typical values of the resistance capacitances of the wave shaping network for one light valve projector of the character described may be as follows:

Resistance 60=47,000 ohms.
Capacitance 61=5 to 80 picofarads.
Resistance 62=47,000 ohms.
Capacitance 63=20 picofarads.

The resistances 60 and 62 function additionally as current limiting and isolating resistances for the horizontal and vertical blanking pulse signal sources. Capacitance 63 inherently exists between the various connections among the discrete circuit elements of the system.

The blanking voltage amplifier 53 comprises a cathode 70, a grid 71 and an anode 72. The cathode 70 is connected through cathode resistance 73 to ground. The grid 71 is connected to a source of vertical blanking signals in the block 26. The anode 72 is connected through an anode load resistance 74 to the positive terminal of source 25. The anode 72 is also coupled through capacitance 73 to the junction point of resistance 62 and capacitance 64 to provide blanking for the television system during the vertical retrace interval of the electron beam.

It will be appreciated by those skilled in the art that the invention may be carried out in various ways and may take various forms and embodiments other than the illustrative embodiments heretofore described. Accordingly, it is to be understood that the scope of the invention is not limited by the details of the foregoing description, but will be defined in the following claims.

What I claim as new and desire to secure by Letters Patent of the United States is:

1. In a projection system including a deformable light modulating medium extending across an electric charge deposition area and means for producing an electron beam for depositing electric charge on said deformable medium in said area, means for moving said medium to advance different portions of said medium into said area, means for applying a train of waves of voltage each having a long interval of increasing voltage and a short interval of decreasing voltage for periodically deflecting said beam across said area gradually from the side into which said medium moves to the opposite side thereof in lines spaced from one another in a direction orthogonal to the direction of said periodic deflection, means for modulating said beam during the deflection thereof to deposit electric charges on said medium in said area thereby producing corresponding light deviating deformations therein, a first network including a resistor and a capacitor connected in parallel, a second network including another resistor and another capacitor connected in parallel, said capacitors having different capacitances, said first and second networks connected in series, means for applying a train of essentially square pulses of voltage between the remote ends of said networks, each of said pulses occurring during a sharply falling portion of a respective wave, means for deriving between the common end and one of the remote ends of said networks a second train of essentially square pulses of voltage and a third train of pulses each of short duration and occurring essentially on the termination of a respective pulse of said second train, means for applying said second and third train of pulses to said beam producing means to block current in said beam during the occurrence of the pulses of said second train and to pass current in said beam during the occurrence of said short pulses to deposit charges of a predetermined quantity on said medium in corresponding parts of each line of deflection during the occurrence of said short pulses.

2. In a projection system including a deformable light modulating medium extending across an electric charge deposition area and means for producing an electron beam for depositing electric charge on said deformable medium in said area, means for moving said medium to advance different portions of said medium into said area, means for applying a train of waves of voltage each having a long interval of increasing voltage and a short interval of decreasing voltage for periodically deflecting said beam across said area gradually from the side into which said medium moves to the opposite side thereof in lines spaced from one another in a direction orthogonal to the direction of said periodic deflection, means for modulating said beam during the deflection thereof to deposit electric charges on said medium in said area thereby producing corresponding light deviating deformations therein, a first network including a resistor and a capacitor connected in parallel, a second network including another resistor and another capacitor connected in parallel, said one capacitor having a larger capacitance than said other capacitor, said first and second networks connected in series, means for applying a train of essentially square pulses of voltage between the remote ends of said networks, each of said pulses occurring during a sharply falling portion of a respective wave, means for deriving between the common end of said networks and the remote end of the network including said other capacitor a second train of essentially square pulses of voltage and a third train of pulses each of short duration and occurring essentially on the termination of a respective pulse of said second train and of opposite polarity thereto, means for applying said second and third train of pulses to said beam producing means to block current in said beam during the occurrence of the pulses of said second train and to pass current in said beam during the occurrence of said short pulses to deposit charges of a predetermined quantity on said medium in corresponding parts of each line of deflection during the occurrence of said short pulses.

3. In a projection system including a deformable light modulating medium extending across an electric charge deposition area and means for producing an electron beam for depositing electric charge on said deformable medium in said area, means for moving said medium to advance different portions of said medium into said area, means for applying a train of waves of voltage each having a long interval of increasing voltage and a short interval of decreasing voltage for periodically deflecting said beam across said area gradually from the side into which said medium moves to the opposite side thereof in lines spaced from one another in a direction orthogonal to the direction of said periodic deflection, means for modulating said beam during the deflection thereof to deposit electric charges on said meduim in said area thereby producing corresponding light deviating deformations therein, a first network including a resistor and a capacitor connected in parallel, a second network including another resistor and another capacitor connected in parallel, said one capacitor having a smaller capacitance than said other capacitor, said first and second networks connected in series, means for applying a train of essentially square pulses of voltage between the remote ends of said networks, each of said pulses occurring during a sharply falling portion of a respective wave, means for deriving between the common end of said networks and the remote end of the network including said other capacitor a second train of essentially square pulses of voltage and a third train of pulses each of short duration and occurring essentially on the termination of a respective pulse of said second train and of the same polarity thereto, means for applying said second and third train of pulses to said beam producing means to block current in said beam during the occurrence of said pulses of said second train and to pass current in said beam during the occurrence of said short pulses to deposit charges of a predetermined quantity on said medium in corresponding parts of each line of deflection during the occurrence of said short pulses.

References Cited by the Examiner

UNITED STATES PATENTS 3,155,871 11//1964 Good et al. --------- 315—22

DAVID G. REDINBAUGH, *Primary Examiner.*

J. McHUGH, *Assistant Examiner.*